United States Patent [19]

Gilbert et al.

[11] 3,950,282

[45] Apr. 13, 1976

[54] POLYANHYDROGLUCOSE BIODEGRADABLE POLYMERS AND PROCESS OF PREPARATION

[76] Inventors: Richard D. Gilbert, 713 Dartmouth Road, Raleigh, N.C. 27609; Vivian T. Stannett, 1105 Bancroft St., Raleigh, N.C. 27612; Soojaa L. Kim, 2209 E. Cedar St., Apt. C., Allentown, Pa. 18103

[22] Filed: Dec. 6, 1974

[21] Appl. No.: 530,349

[52] U.S. Cl. .................... 260/9; 260/8; 260/13; 260/16; 260/17.4 GC; 260/77.5 AS; 260/DIG. 43; 424/19; 424/22; 424/35; 424/36; 424/78
[51] Int. Cl.² ......................................... C08L 1/02
[58] Field of Search ............ 260/13, 9, 16, 77.5 AS, 260/DIG. 43, 233.3, 233.5, 229, 230

[56] References Cited
UNITED STATES PATENTS

| | | | |
|---|---|---|---|
| 2,668,169 | 2/1954 | Wolff et al. ...................... | 260/233.5 |
| 2,991,269 | 7/1961 | Nozaki ............................. | 260/45.5 |
| 3,311,608 | 3/1967 | Murphy ............................ | 260/212 |
| 3,386,930 | 6/1968 | Santangelo ....................... | 260/13 |
| 3,386,931 | 6/1968 | Smart et al. ...................... | 260/13 |
| 3,386,932 | 6/1968 | Steinmann ....................... | 260/16 |

FOREIGN PATENTS OR APPLICATIONS

| | | | |
|---|---|---|---|
| 656,643 | 8/1951 | United Kingdom ............... | 260/77.5 |

OTHER PUBLICATIONS

Chem. Absts. Vol. 74, 1971, "Reaction of Cellulose with Hexamethylene Diisocyanate," Gafurov et al.

*Primary Examiner*—Donald E. Czaja
*Assistant Examiner*—Edward Woodberry
*Attorney, Agent, or Firm*—Christen & Sabol

[57] ABSTRACT

The biodegradable polymer having the formula:

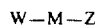

wherein M is a polyanhydroglucose block which does not contain any ester substituents and wherein W and Z are organic diisocyanates having the formula:

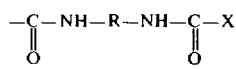

or

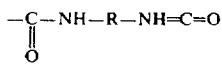

wherein R is an divalent organic radical and wherein X is a terminal group, —M—Z, —M—W or —M. The process of preparing the biodegradable polymer wherein M contains at least one ester substituted hydroxyl group which comprises deesterifying M to obtain M as a polyanhydroglucose block which does not contain any ester substituents.

10 Claims, 1 Drawing Figure

ENZYMATIC HYDROLYSIS

POLYANHYDROGLUCOSE BIODEGRADABLE POLYMERS AND PROCESS OF PREPARATION

BACKGROUND OF THIS INVENTION

1. Field of This Invention

This invention relates to the field of biodegradable polymers and processes of preparing such.

2. Prior Art

The disposal of polymers was not a major problem prior to 1940 as the usage of polymers per capita was relatively low. Besides the major thermoplastic resins were essentially regenerated cellulose and various cellulose derivatives (which were also the main packaging materials at that time) and the main fiber for apparel, etc., was cotton cellulose of rayon. These cellulosic componds are completely biogradable. A wide variety of soil and marine microorganisms have the ability to enzymatically hydrolyze cellulose to soluble intermediates, which in turn serve as a carbon source for microbial and fungal growth. As a result, the waste cellulosics were removed from the environment and there was little or no disposal problem. However, since the 1940's a large variety of new synthetic polymers (having many varied properties) have been synthesized and have been used to package every conceivable item. In addition, the use of man-made fibers exceeds that of cotton fiber in the United States and is nearly equal to cotton fiber usage world-wide. Almost without exception, the synthetic polymers (including man-made fibers) used today are non-biodegradable. This has created a large disposal problem which is having a serious ecological and environmental impact. The preparation of biodegradable synthetic polymers would be of considerable importance of resolve the social and economic problems caused by the wide-spread use of synthetic polymers.

Polyethylene, polypropylene and polyvinyl chloride, the leading packaging resins, are all inherently unstable, but this property alone would make them unsuitable for packaging. So additives have to be added to make them stable but this makes them stable when thrown out as waste or litter.

Heap, Wendy M., et al., "Microbiological Deterioration of Rubbers and Plastics", J. Appl. Chem., Vol. 18 (July 1968 ), pp. 189–194, reviews the microbiological deterioration of rubbers and plastics. To some degree, many synthetic and naturally-occuring polymers are stated to be attacked, but it is not possible to say which chemical group in each polymer is susceptible. Heap et al. states: that cellulose plastics such as the acetate, acetate-butyrate, and propionate, as well as ethyl cellulose and benzyl cellulose are reported to be fairly resistant to attack by micro-organisms, although their susceptibility can be affected by the type of plasticiser used; and that this is in contrast to cellulose and cellulose nirate which appear to be appreciably susceptible to fungal growth. To close the report, Heap et al. stated that the main conclusions which can be drawn from this review are that the available evidence is confused, contradictory and in some cases misleading.

Worne, Howard E., "Modern Plastics For Degradability", Plastic Tech., (July 1971), pp, 23, 26 and 28, sets out many of the problems associated with plastics waste disposal. Worne states cellulosics originally used for most transparent packaging are biodegradable. A wide variety of soil and marine micro-organisms enzymatically hydrolyze the insoluble cellulose to intermediates which in turn serve as a source of carbon for fungal growth. The cellulosics are basically ultraviolet light stable and cannot be easily degraded in sunlight.

Almost all of the new synthetic polymers have, with almost no exceptions, polymer structures with configurations that cannot be broken down by soil microorganisms, and which lack the necessary constitutive enzyme systems capable of biodegrading these polymers.

"Biodetermination of Plastics", SPE Trans., (July 1964), pp. 193–207, is a review of the efect on non-cellulosic plastics of attack by various organisms. But Table 1 on page 198 states that cellulose acetate has poor to good microbial resistance depending upon the degree of acetylation — see also pages 206 and 207.

Rodriguez, F., "The Prospects For Biodegradable Plastics", Chem. Tech., (July 1971), pp. 409–415, teaches that cellulose decomposes readily when attacked by a wide variety of microorganisms.

U.S. Pat. No. 3,386,930 teaches filaments prepared from copolymers containing soft and hard segments. The hard segments are cellulose triacetate and the soft segments are certain diisocyanates.

U.S. Pat. No. 3,364,157 discloses block and graft copolymers containing at least one segment of an oxymethylene polymer. Such block and graft copolymers have modified strength characteristics, flow characteristics, solvency, crystallinity, and thermal stability. The copolymer can have the structure:

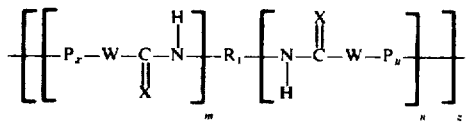

wherein $P_x$ is an oxymethylene polymer segment, $P_y$ is a dissimilar organic polymeric segment, X is an atom selected from the group consisting of oxygen and sulfur atoms, $R_1$ is an organic radical selected from the group consisting of divalent and trivalent aliphatic cycloaliphatic, and aromatic radicals having up to about 20 carbon atoms, W is selected from the group consisting of —O—, —S—,

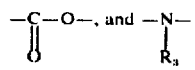

where $R_3$ is selected from the group consisting of hydrogen, halogen, and alkyl having one to five carbon atoms, m and n are integers from one to two, $m+n$ is an integer from two to three, and Z is an integer from one to 100. $P_y$ can be cellulose or its derivatives, such as, the cellulose esters. To show that biodegradable polymers were not even contemplated, column 5, lines 62 to 69, the peferred polymeric co-blocks includes cellulose esters having an acetyl value of between about 50 and 62 percent.

U.S. Pat. No. 3,821,136 teaches a polyurethane polymer which can be used, for example, as a controlled release agent. Such polymers have pronounced hydrophilicity. U.S. Pat. No. 3,316,186 discloses certain quick drying printing inks which include a polyol prepolymer, a diisocyanate prepolymer, and a reactive polymeric resin hardener.

U.S. Pat. No. 3,475,356 teaches certain solvent resistant cross-linked polymers prepared from an ester of cellulose with at least one alkanoic acid, a particular linear saturated synthetic polymer and a particular organic diisocyanate.

U.S. Pat. No. 3,386,931 teaches certain copolymers which are the reaction products of an organic diisocyanate, a non-cellulosic polymer containing terminal functional groups, and a high-molecular-weight cellulose triester of a lower aliphatic acid. It also teaches graft polymers which are the reaction products of the last two above-mentioned reactants.

Taylor, Lynn J., "Polymer Degradation: Some Positive Aspects" Chem. Tech., (Sept. 1973), pp. 552–559, which is not prior art against this invention, surveys the entire polymer degradation field. Taylor teaches that cellulose and cellulose ethers are generally biodegradable.

A comprehensive review of the field of block copolymers is found in "Block Copolymers", D. C. Allport and W. H. Janes, Ed., John Wiley & Sons, New York, 1973. Among the many methods of synthesis, the use of diisocyanates as coupling agents for polymeric diols and other difunctional polymers has been investigated — see D. C. Allport and A. A. Mohajer in "Block Copolymers," ibid, ch. 5. This method has been extended to cellulosic blocks using cellulose triacetate oligomeric species having hydroxyl end-groups which are capable of reacting with polyester, polyether, or other polymers containing hydroxyl or other functional end-groups by coupling with organic diisocyanates. See Steinmann, H. W., Polym. Prepr., 11 (1), 285 (1970) and U.S. Pat. No. 3,386,932 (H. W. Steinmann). Such copolymers are interesting because of their novel properties, for example, Steinmann has prepared elastomeric fibers from his block copolymers.

U.S. Pat. No. 2,836,590 discloses an improvement in the partial deacetylation of organic acid esters of cellulose by alcoholysis.

No prior art is known which teaches the deacylation of cellulose triacetate oligmer block copolymers let alone that such are biodegradable polymers.

BROAD DESCRIPTION OF THIS INVENTION

An object of this invention is to provide biodegradable polymers. Another object of this invention is to provide a process for the production of such biodegradable polymers. Still another object of this invention is to provide a biodegradable polymer which degrades causing a minimum of ecological disturbance. A further object of this invention is to produce biodegradable polymers which biodegrade at a faster rate than cellulose itself, such biodegradation being achievable in a controlled and effective manner.

Other objects and advantages of this invention are set out in this application or are obvious to one ordinarily skilled in the art from this invention.

The objects and advantages of this invention are achieved by the biodegradable polymers and the process of this invention.

This invention includes the concept of preparing biodegradable polymers by incorporating therein a cellulose block, a starch block or another similar biodegradable organic block.

The removal of the hydroxyl blocking acetyl groups of the cellulose triacetate blocks or cellulose oligomer blocks or starch oligomer blocks results unexpectedly in a group of biodegradable block copolymers which have a wide variety of properties depending upon the non-cellulose or non-starch blocks or monomers therein.

The biodegradable polymers of this invention degrade (enzymatically) more rapidly than cellulose itself.

This invention includes the biodegradable polymer having the formula:

wherein M is a polyanhydroglucose block which does not contain any ester substituents and wherein W and Z are organic diisocyanates having the formula:

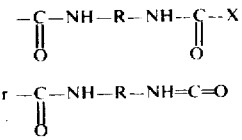

wherein R is an divalent organic radical and wherein X is a terminal group, —M—Z, —M—W or —M. Preferably M is a cellulose oligomer block, X is —OH, and R is a polyglycol, a polyester, a polyamide or a polyether.

This invention also includes the process of preparing the biodegradable polymer of this invention wherein M contains at least one ester substituted hydroxyl group which cmprises deesterifying M to obtain M as a polyanhydroglucose block which does not contain any ester substituents.

The biodegradable polymers of this invention can be used in any application where such biodegradable polymers would be useful. The biodegradable polymers are degradable in the body and can be used as compounds or covers for drug encapsulation, as body implants, as carriers for drugs, etc. The biodegradable polymer can be a carrier for drugs (encapsulating) which are implanted that give a controlled dosage of the drugs in a slow-release manner.

The biodegradable polymers can be used as packaging which disintegrates biological when thrown away as liter. The rate of biological disintegration can be controlled by the composition of the biodegradable polymers.

The biodegradable polymers can be used as agricultural film, for example, as wrapping for the roots of plants that are planted, for the controlled release of pesticides, and for mulching films for the controlled release (rate and amount) of agricultural chemicals.

The organic blocks attached to the cellulose oligomer blocks often contain unique and useful properties which can be beneficial to plants, living organisms and the soil (such being available is small unit size when the biodegradable polymers are degradated). For example, the released end organic unit may be various vital amino acids.

The organic blocks attached to the cellulose oligomer blocks can have therapeutic activity, which becomes available as the macromolecular polymer is degraded into smaller molecules.

The biodegradable polymer of this invention can be degraded and recycled for use as raw material (monomers) to prepare new biodegradable polymer.

DETAILED DESCRIPTION OF THIS INVENTION

Figure 1:
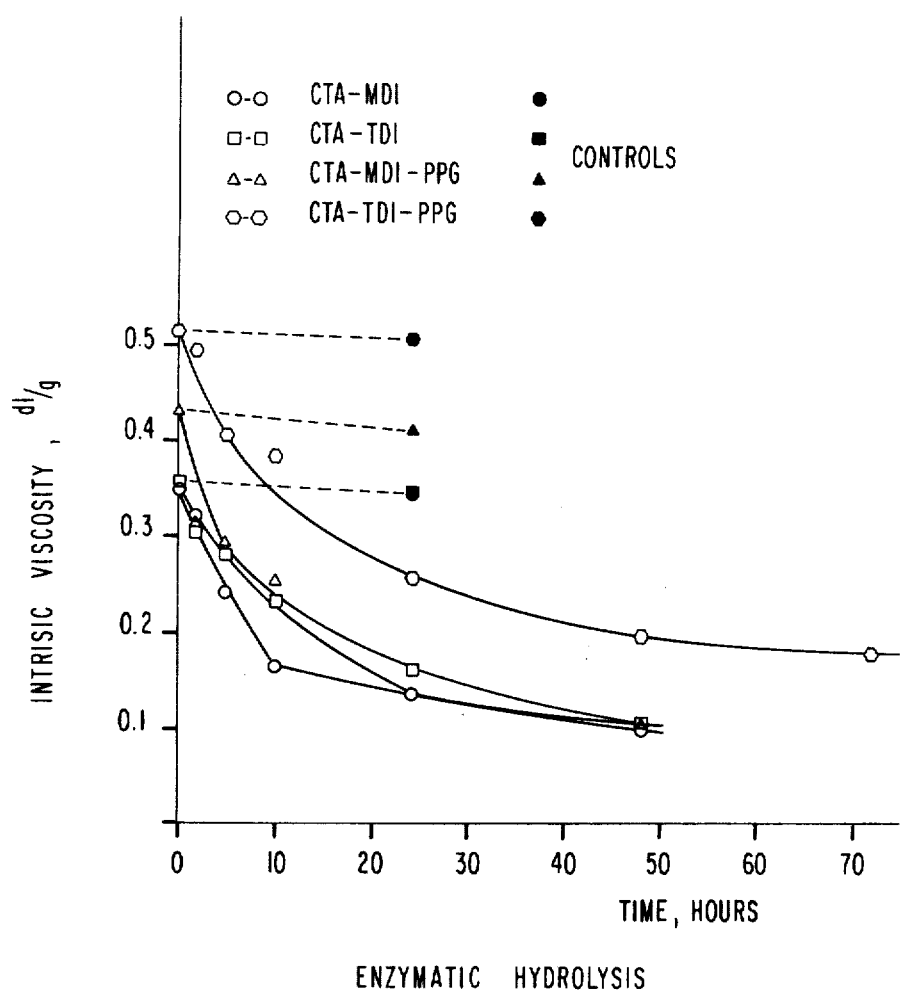

Biodegradable includes deterioration or degradation caused by any micro-organism or secretions. Such micro-organisms include bacteria and fungi. Actually the degradation is believed to involve the organic material (cellulose oligomer block, etc.) being broken down enzymatically, producing a carbon source, for example, used by the bacteria and fungi. The enzymes attack the biodegradable blocks, breaking up the biodegradable polymer into smaller segments. The degradation may involve chain scission into lower molecular weight units. The enzymatic action involves the action of extracellular enzymes produced by the micro-organisms but functioning outside such micro-organisms.

Biodegradation occurs most at high ambient temperatures, at high humidities and in the absence of ultraviolet light. Also biodegradation is comparatively fast in soil and underground workings, e.g., coal mines. Such conditions should be avoided when biodegradation is sought for the polymers of this invention and vice versa.

The polymers of this invention can be biodegraded in an atmospheric environment and/or a marine environment and/or in the soil and/or in animals and/or humans. Of course, biodegradation is most pronounced in the soil, animal or human — which is important in that it allows the biodegradable polymers to be used in certain ways without premature degradation and then degraded as desired when put in certain environments.

The biodegradable polymers of this invention do not take any special agents or treatment to degrade the, just location in certain environments. This is an important advantage when the biodegradable polymers become waste.

The biodegradable polymers of this invention are basically ultraviolet light stable and cannot easily be degraded by only the action of sunlight.

The following illustrates the preferred embodiment of this invention. A block polymer is prepared by reacting equimolar amounts of depolymerized cellulose triacetate (CTA) and a diisocyanate, followed by deacylation of the resultant copolymer to yield a block copolymer containing cellulose oligomer blocks. A schematic of the reaction is:

viscosity of the copolymers even after 10 hours incubation time. Incubation with a cellulose enzyme (e.g., with cellulysin at pH 5 and 50°C.) results in a rapid decrease in molecular weight. Further the copolymers degraded faster than cellulose itself, probably due to its lower accessibility.

Cellulose triacetate can be depolymerized in an acetic acid solution (e.g., 99.4 percent) following the procedure of Steinmann, H. W., Polym. Prepr., 11 (1), 285 (1970), or that set forth in U.S. Pat. No. 3,386,932. Generally any high molecular weight polyanhydroglucose triesters have to be depolymerized before being used in the process of this invention. Such high molecular weight polyanhydroglucose triesters can be depolymerized while maintaining the ester groups thereof substantially intact, by contacting a solution of the high molecular weight polyanhydroglucose triester with an acid catalyst and recovering depolymerized low molecular weight polyanhydroglucose triester.

The diisocyanate has the formula:

$$O=C=N-R-N=C=O$$

wherein R can be any organic moiety or organic moiety containing an inorganic moiety or substituted by an inorganic moiety. R can also be an inorganic moiety. R for example can be a polyglycol, a polyester, a polyamide, or a polyether.

When R is a polyester or polyether, examples of polyhydroxyl compounds which may be used to prepare such polyester or polyether segments include: ethylene glycol, diethylene glycol, triethylene glycol, pentamethylene glycol, hexamethylene glycol, decamethylene glycol, dodecamethylene glycol, propylene glycol, 1,2-propylene glycol, 1,3-propylene glycol, butanediol-1,2, butanediol-2,3, butanediol-1,3, butanediol-1,4, isobutylene glycol, pinacol, hexanediol-1,4, pentanediol-1,5, 2-methyl-2,4-pentanediol, heptanediol-1,7, heptanediol-1,4, thiodiglycol, n-butyldie-

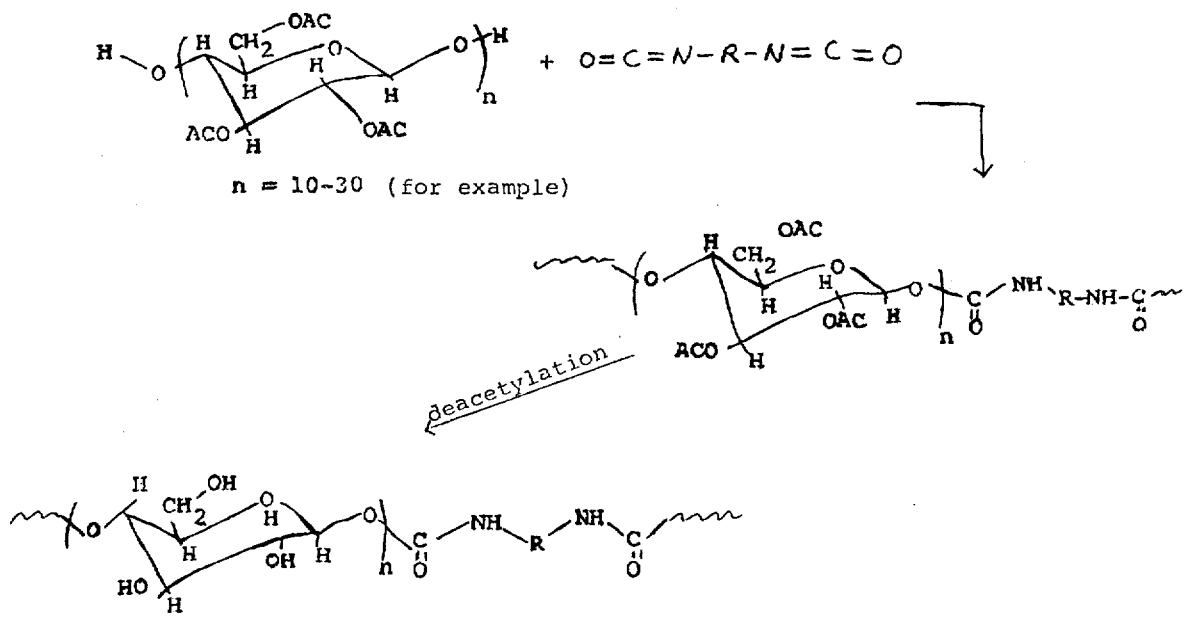

n = 10-30 (for example)

There is negligible acid hydrolysis of the copolymers. However, there is a substantial decrease in intrinsic thanolamine, N-N-diethanolaniline, hydroquinonediglycol ether, transhexahydroxylene glycol, m-dihydroxybenzene, and o-dihydroxybenzene. When R is a polyester or polyether, examples of the dicarboxylic acids which may be employed with polyester segments include: adipic, betamethyl adipic, azelaic, fumaric, glutaric, 2-phenylglutaric, malic, maleic, malonic, sebacic, suberic, succinic, pimelic, 4-ketopimelic, itaconic, dehydromuconic, decane-1,10-dicarboxylic, ketoundecanedioic, acetylenedicarboxylic, acetone dicarboxylic, diphenic, p-phenylenediacetic, phthalic, isophthalic, teraphthalic, hexahydroterephthalic, cyclopentane-1,2-dicarboxylic, cyclopentane-1,3-dicarboxylic, cyclohexene-1,2-dicarboxylic, cyclohexane-1,3-dicarboxylic, cyclohexane-1,4-dicarboxylic, naphthalene-1,2-dicarboxylic, naphthalene-1,3-dicarboxylic, naphthalene-1,4-dicarboxylic, naphthalene-1,5-dicarboxylic, diphenylene-2,2-dicarboxylic, diphenylene-4,4-dicarboxylic, diphenylene-2,4-dicarboxylic, xylylene-1,4-dicarboxylic, xylylene 1,3-dicarboxylic, xylylene-1,2-dicarboxylic and camphoric acids.

Examples of useful polyamines which R can be are ethylenediamine, diethylenetriamine, triethylenetetramine, 1,3-butanedinamine, 1,3-propanediamine, 1,4-butanediamine, 1,2-, 1,3-, 1,4-, 1,5-, and 1,6-hexanediamine, phenylenediamines, toluenediamine, naphthalenediamines, polycarbonamides, and polyhexamethylene diamide adipate and polysulfonamides.

Examples of polyglycols which R can be are polyethylene glycol and polypropylene glycol. Mixtures of R can be used.

Examples of useful diisocyanates (polyisocyanates) are trimethylene diisocyanate, tetramethylene diisocyanate, pentamethylene diisocyanate, hexamethylene diisocyanate, decamethylene diisocyanate, cyclopentylene-1,3-diisocyanate, 1,4-diisocyanato cyclohexane, p-phenylene diisocyante, m-phenylene diisocyanate, the tolylene diisocyanates, e.g., 2,4-2,6- or 1,6-toluene diisocyanate, the naphthalene diisocyanates e.g. 1,4-naphthalene diisocyanate, 4,4'-diphenyl propane diisocyanate and 4,4-diphenylmethane diisocyanate. The diisocyanate is preferably polypropylene glycol capped with diphenylmethane diisocyanate (MDI) or m-tolylene diisocyanate (TDI).

More generally R is an aliphatic including alicyclic compounds such as aliphatic, aliphatic-alicyclic, and aliphatic-aromatic hydrocarbon compounds from 4 to 36 carbon atoms (but more conventionally from 6 to 20 and generally from 6 to 13 carbon atoms), divalent alkylene groups having 2 to 10 carbon atoms.

Most broadly, R is an organic radical and preferably represents a divalent aliphatic, cycloaliphatic or aromatic moiety, including the substituted derivatives thereof, having up to 36 carbon atoms. Aliphatic being defined as saturated and unsaturated (non-benzenoid) hydrocarbons and their substituted derivatives, having an open chain structure; inclusive of the paraffin, olefin, and acetylene hydrocarbons and further including compounds containing a minor proportion of heteroatoms, selected from the group consisting of oxygen, sulfur, and nitrogen in the open chain structure; distinguishing from aromatic, and cyclic compounds. Cycloaliphatic being defined identically to aliphatic with the exception that the term encompasses the cyclic aliphatic structures, including the heterocyclics where the hetero atoms are present in minor proportion; distinguished from the open chain aliphatics and the aromatic compounds. Aromatic being defined as hydrocarbons and their substitued derivatives having at least one ring having benzenoid unsaturational inclusive of monocyclic bicyclic, and polycyclic hydrocarbons and those compounds having a minor proportion of heteratoms selected from the group consisting of oxygen, sulfur, and nitrogen; distinguished from aliphatic and cycloaliphatic compounds.

The coupling agent is broadly an organic diisocyanates, (OCN—R—NCO), diisothiocyanates (SCN—R—NCS) or isocyanateisothiocyamates (OCN—R—NCS), but may also be of higher functionality (e.g., triisocyanates, polyisocyanates, etc.)

Suitable compounds include, for example, aromatic diisocyanates, such as 2,4-toluene diisocyanate; 2,6 toluene diisocyanate; 1,6 toluene diisocyanate; diphenyl methane, 4,4' diisocyanate; 3,3' dimethyl 4,4' diphenylene diisocyanate (3,3 bitoluene 4,4' diisocyanate); m-phenylene diisocyanate; p-phenylene diisocyanate; o-phenylene diisocyanate; methane diisocyanate; chlorophenylene-2,4-diisocyanate; chlorophenylene 2,4-toluene diisocyanate; 3,3'dichlorodiphenyl-4,4'diisocyanate; 4 chloro-1,3-phenylene diisocyanate; xylene 1,4 diisocyanate; dixylylene methane 4,4' diisocyanate; 1,5 naphthalene diisocyanate, 1,4 naphthalene diisocyanate, and the corresponding diisothiocyanates and the isocyanateisothiocyanates; alkylene diisocyanate,s such as 1,6 hexamethylene diisocyanate; 1,2 ethylene diisocyanate; 1,3-propylene diisocyanate; 1,4-tetramethylene diisocyanate; 1,5 pentamethylene diisocyanate; and the corresponding diisocyanates and the isocyanate-isothiocyanates; alkylidene diisocyanates, such as ethylidene diisocyanate and propylidene diisocyanate and the corresponding diisothiocyantes and the isocyanate-isothiocyanates; cyclo aliphatic diisocyanates, such as 1,3 cyclohexylene diisocyanate; 1,3 cyclopentylene diisocyanate; 1,4 cyclohexylene diisocyanate; 4,4' methylenebis-(cyclohexyl isocyanate) and the corresponding diisothiocyanates and isocyanate-isothiocyanates; trisocyanates, such as triphenyl methane triisocyanate; 1,3,5 benzene triisocyanate, and the corresponding isothiocyanates and the isocyanate-isothiocyanates. Mixtures of any of the aforementioned compounds, such as mixtures of the 2,4 and 2,6 isomers of toluene diisocyanate, may also be desirable in certain applications. The preferred coupling agents are the organic diisocyanates.

Generally when a diisocyanate is employed, a molar ratio of diisocyanate to the polysaccharide in a range from about 2.5:1 to 1.5:1 and preferably in a molar range from about 2:1 to 1.5:1 is utilized.

The basic cellulose unit has five hydroxyl groups, two of which are involved in linkage with other basic cellulose units (except for end cellulose units). The three remaining hydroxyl groups have been acetylated i.e., with an acetyl group. Mono- and/or di-acetate cellulose are used only when it is desired to have more than two diisocyanate substituents (i.e., have one or more branch chains).

Herein the term "cellulose triacetate" has reference to cellulose wherein substantially all of the hydroxyl groups of the cellulose have been esterified. The degree of esterification can be expressed in terms of an acetyl value calculated as combined acetic acid by weight with the theoretical maximum of pure cellulose triacetate having a value of 62.5%. A fully esterified cellulose derivative results in a bifunctional block copolymer substantially free of cross-linking, i.e., interchain linkages. (When strict linearity is not wanted or a functionality greater than 2 wanted, fully esterified cellulose is not started with.) Generally the cellulose acetates have acetyl values of between about 55 and 62.5, preferably at least 59 percent.

Acetylated starch can be used in place of the cellulose triacetate, as can any similar acetylated polysaccharide which is biodegradable when deacetylated. Any such acetylated polysaccharide must have at least two unacetylated hydroxyl groups for copolymer formation with the diisocyanates. Starch is a mixture of amylose and amylopectin, so mixed polysaccharides can be used. Glycogen, which is animal starch, is listed herein as starch. triacetylated amylose can be used:

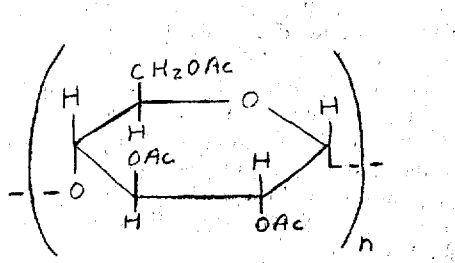

Triacetylated amylopectin can be used. Chitin is a polysaccharide similar to cellulose except that a acetylamino group has replaced the hydroxyl group at C-2. When the two remaining hydroxyl groups have been acetylated, the fully acetylated chitin can be used.

The above-mentioned polysaccarides are known as homopolysaccharides (i.e., they contain a single type of building unit). Heteropolysaccharides (i.e., they contain at least two different types of building units) can also be used.

Polysaccharide is defined herein as having more than three saccharide units.

Preferably the biodegradable oligomer block is derived from cellulose triacetate, starch triacetate, etc., but can be derived from any organic acid ester of a polysaccharide, such as, cellulose tripropionate, cellulose tributyrate, cellulose tricrotonate, cellulose tribenzoate, cellulose triphthalate, cellulose diacetate propionate, cellulose acetate dibutyrate, cellulose diacetate crotonate, cellulose diacetate sorbate, cellulose diacetate phthalate, amylose tribenzoate, starch tributyrate, amylose tricrotonate and starch tripropionate. Good results are obtained when the organic acid ester is a lower fatty acid (1 to 6 carbon atoms). The ester portions can be removed by any conventional method.

The biodegradable polymer (say, as a film or a fabricated article) can be coated by a short-lived biocide which helps protect the biodegradable polymer during the useful life of such but which degenerates rapidly after the biodegradable polymer is discarded.

The pertinent portions of U.S. Pat. No. 3,386,932 are incorporated herein by reference.

The acetylated oligomer is reacted with other monomers or polymers to yield a block copolymer containing low molecular weight cellulose triacetate blocks coupled to a polymer. Generally, a coupling agent, preferably an organic diisocyanate is employed. The cellulose blocks, where suitably terminated, e.g., with carboxyl groups, may be reacted directly with other polymers, e.g., amide blocks having terminal amino groups such as low molecular weight nylon 6, or may be further treated (with e.g., a diamine such as hexamethylene diamine) to form a polymerizable moiety (in this case, an amine salt, yielding amine linkages upon condensation).

The polymerization reaction of diisocyanate and polyanhydroglucose triester can be carried out in a medium comprised of an organic solvent, particularly halogenated hydrocarbons, such as, for example, chlorinated lower alkylenes. The employment of ethylene chloride or methylene chloride or mixtures thereof is extremely desirable as a reaction medium.

The polymerization step is catalyzed by tertiary amines, such as, for example, triethylamine, tributylamine and N-methylmorpholine. Further, the polymerization reaction can be carried out at room temperature or at an elevated temperature and at an atmospheric pressure or at autogeneous pressure.

Any sequence of addition can be selected. It is most desirable that the reaction be carried out under anhydrous conditions in an inert atmosphere, such as, dry nitrogen. In the preparation of the acetylated (esterified) cellulose or other polysaccharide block polymer, the acetylated cellulose or other polysaccharide can contain functional terminal groups other than hydroxyl groups. Any of a wide variety of such terminating agent having active hydrogen containing substituents may be employed to modify the cellulose terminal groups. For example, novel cellulose triacetate blocks with mercapto, hydroxy or carboxy substituents may be prepared by adding to the reaction system, preferably comprising a non-oxidizing catalyst (e.g., a boron halide-chlorohydrocarbon system), a selected mercaptan, hydroxyaryl compound or dibasic acid/acid anhydride mixture, respectively. Generally speaking, any bifunctional compound having active hydrogen substituents, e.g., hydroxy, carboxy, amino, amido, mercapto, etc., may be employed in this manner, but those of little tendency to hydrolytically remove the ester substituents or transesterify the cellulosic are preferred. The mercaptans, hydroxy aromatics, and organic acid/anhydride systems have been found most useful.

The cellulose triacetate portion of the polymer of this invention can be deacetylated by any suitable method. Likewise, any of the polyanhydroglucose triester portion of the polymer of this invention can be de-esterified by any suitable method. Most such methods have the problem that during deesterification some molecular weight degradation of the polyanhydroglucose diester occurs.

As molecular weight degradation of cellulose is minimal under basic conditions especially under an inert atmosphere, a procedure involving sodium methoxide in methanol and under a $N_2$ atmosphere was preferably employed. Sodium ethoxide in ethanol is equally preferable. These deacylation reagents have been found to cause minimal molecular weight degradation in studies of the osmotic and intrinsic viscosity determinations of cellulose employing soluble cellulose esters. Such preferred methods also are the preferred methods for de-esterifying the polyanhydroglucose triester portion of the polymer of this invention. Broadly, de-esterification under basic conditions especially under an inert atmosphere is desirable.

Another method involves treating the cellulose triacetate(or polyanhydroglucose triester) polymer containing with water and $H_2SO_4$ to remove the acetyl group hydrolytically. The preferred water content is 5 to 20 percent in the final solution to achieve deacetylation in a reasonable time. With less water degradation is a serious problem, and with more water the cellulose acetate may being in precipitate. As molecular weight degradation can occur using such procedure, it is not preferred. Such cleavage of the cellulose blocks also obscures the examination of the susceptibility of the block copolymers to enzymatic attack.

Another method of deacetylation is that of U.S. Pat. No. 2,836,590, the pertinent portions of which are incorporated herein by reference, involves an ester interchange, whereby the cellulose acetate is heated with an alcohol at 180° or higher. Again, as the high temperatures employed in such procedure might, and sometimes do, result in molecular weight degradation it is not preferred. However, slight modification to such procedure makes it adaptable to large scale deacetylation of the block copolymers containing cellulose or starch triacetate blocks of this invention.

An (first) alternative synthesis route for preparing the biodegradable polymers of this invention is represented by the following reaction scheme (which uses conventional addition polymerization procedures):

In the above formulae, X is $—C_6H_5$, $—Cl$,

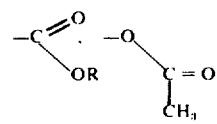

or the like.

In the above formulae, CTA is cellulose triacetate. In the above formulae, R can be any organic moiety or organic moiety containing an inorganic moiety or substituted by an inorganic moiety. R can also be an inorganic moiety. R for example can be a polyglycol, a polyester, a polyamide, or a polyether. R has the same defininition and supporting examples as set out above for the first embodiment of this invention.

A peroxide (e.g., benzoyl peroxide) is used to initiate the polymerization of a vinyl monomer in the presence of a chain transfer agent such as thioethanol. The chain transfer reaction between the vinyl polymer radicals and the thioethanol will terminate the polymer chains and yield a thiol radical which will in turn initiate the polymerization of the vinyl monomer, yielding Compound A.

By control of the ratio of the peroxide to thioethanol concentration only a relatively small number of vinyl

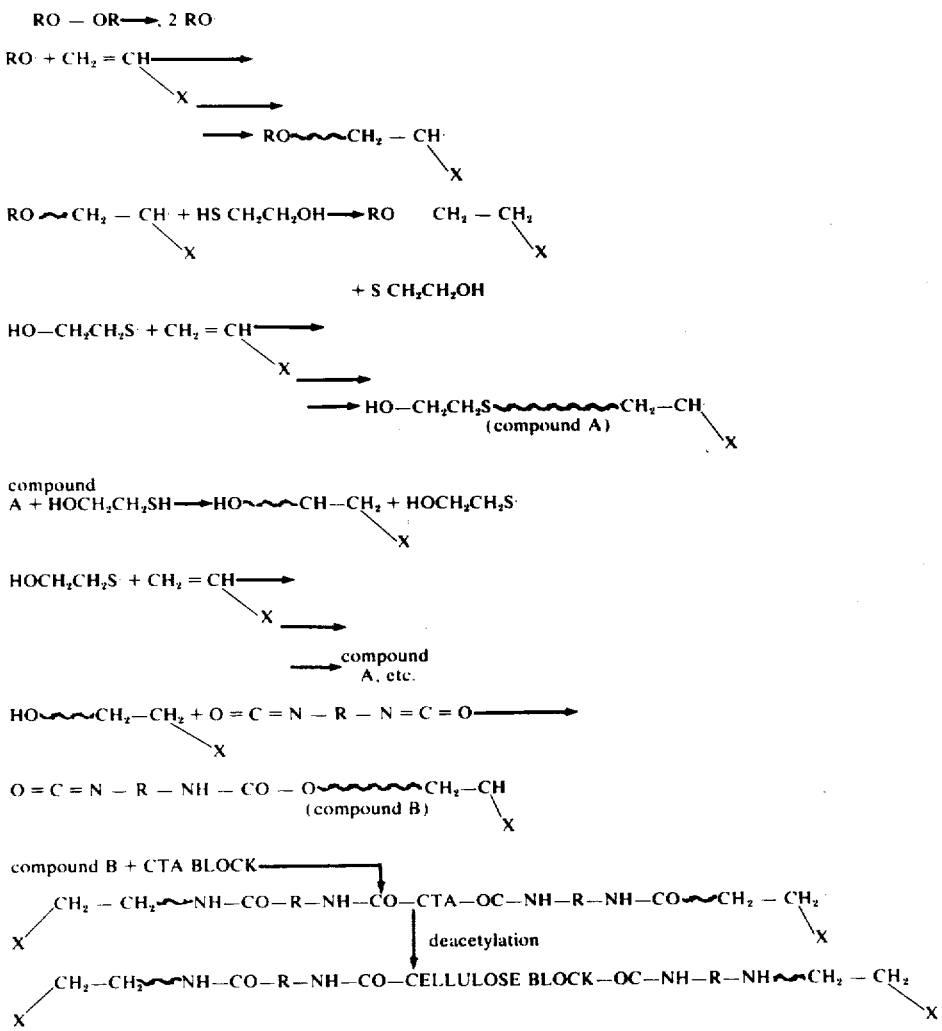

chains are initiated by RO· radicals. Most of the chains will be initiated by thioethanol radicals.

Compound A is a polymeric chain radical, the degree of polymerization of which is determined and controlled by the concentration of the thioethanol via a chain transfer reaction, thereby regenerating a thiol radical which initiates the polymerization of further vinyl monomer. The resulting polymers have a reactive hydroxyl end-group which can be reacted with a diisocyanate to produce the polymer capped at one end with an isocyanate group (compound B). Compound B can then be reacted with the end hydroxyls of a cellulose triacetate oligomer (CTA Block) to yield a block copolymer which after deacetylation will produce a ABA type block copolymer containing a biodegradable cellulose oligomer block.

A starch triacetate block can be substituted for the cellulose triacetate block. In fact any polyanhydroglucose triester can be used in place of the cellulose triacetate block. The above disclosure re support for such is incorporated, including the methods of deacetylation and de-esterification.

A second alternative synthesis route for preparing the biodegradable polymers of this invention is represented by the following scheme:

nition and support as in the first embodiment of this invention. In the above formulae, CELLO is cellulose. Cellulose can be replaced by starch or any other polyanhydroglucose (which are illustrated in the first embodiment of this invention).

This second alternative synthesis route or scheme eliminates some of the synthesis difficulties with the first two synthesis routes. The synthesis and degradation of cellulose acetate is somewhat long and tedious and it is important that no deacetylation occurs during the degradation to the oligomeric series, and chain-extension steps. Otherwise the degree of functionally quickly increases. This results in a rapid increase in the onset of gelation, or conversely, a rapid decrease in the maximum obtainable degree of polymerization (D.P.) of the block copolymer before onset of gelation. Of course, linear chains, without any branches or cross-links, are the most desirable. Branching alone leads to high solution viscosities, and crosslinking produces insoluble gels.

By proper control of the degree of substitution in compound C the second alternative reaction scheme leads to a grafted polymer of the final structure shown in the first alternative reaction scheme containing:

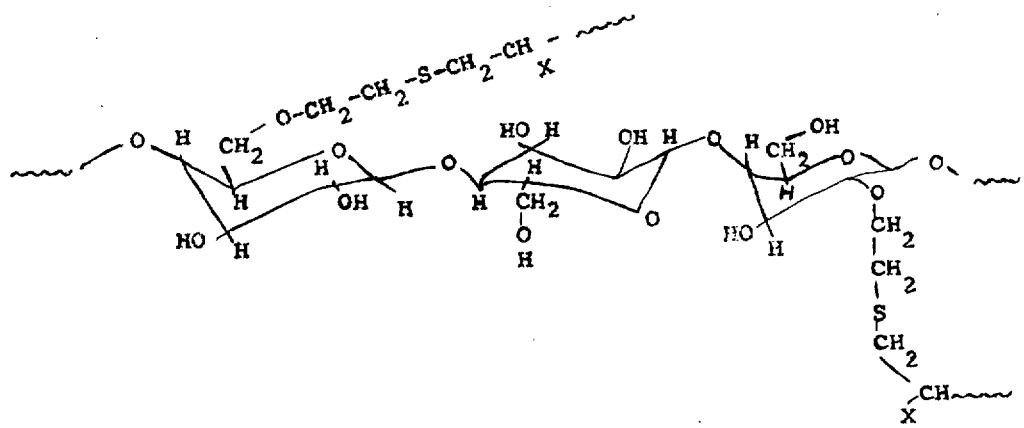

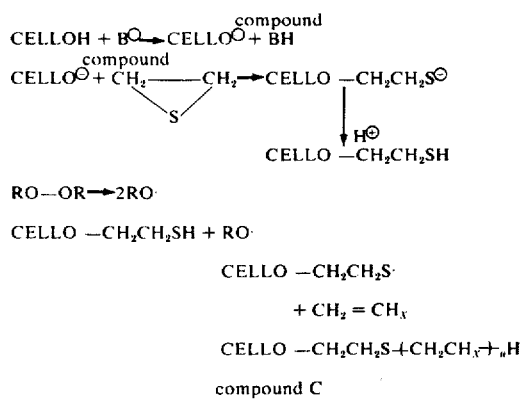

In the above formulae, compound B has the same definition as in the first alternative embodiment of this invention. In the above formulae, R has the same defi- Protein-like materials can be used in place of the cellulose block (polysaccharide block) in the second alternative reaction scheme. Examples of such protein-like materials are phosphoproteides such as casein, prolamines such as zein and gliadin, scleroproteins such as gelatin, keratin, fibroin, collagen (glue and gelatin) and elastin, and histones such as globin. These materials contain disulfide or thiol groups which undergo copolymerization behavior with vinyl monomers such as acrylonitrile and thus can be used directly.

All parts, percentages, ratios and proportions used herein are on a weight basis, unless otherwise stated or obvious to one ordinarily skilled in the art.

EXAMPLE 1

Cellulose triacetate (acetyl value, 43.9 percent; [n] = 1.77 dl/g in 9/1 $CH_2Cl_2/CH_3OH$) was depolymerized using a 99.4 percent acetic acid solution (time of hydrolysis was six hours). The yield was 93 percent; [n] = 0.16 dl/g in 9/1 $CH_2Cl_2/CH_2/CH_2OH$; acetyl value was 45.3 percent; and the m. p. was 220° to 240°C.

The depolymerized cellulose triacetate (CTA) (0.002 mole) was dissolved in a mixture of methylene chloride, i.e., $CH_2Cl_2$, (50 ml) and ethylene chloride (25 ml) contained in a 250 ml 2-necked flask fitted with an agitator and a condenser. The flask and contents were heated with agitation and azetropically distilled to dry the system. About 25 ml. of distillate were collected. Then diphenylmethane diisocyanate (MDI) (0.002 mole) was added under nitrogen. After solution was complete, triethylamine (0.15 ml) was added and the mixture agitated for 7 hours at 70°C. Ethylene chloride (50 ml) was added and the agitation continued overnight at room temperature. The reaction mixture was filtered through a coarse sintered-glass filter, the solvent evaporated under reduced pressure to near dryness, the solid washed with ethanol and then soaked in a 2:1 ethanol - acetone mixture for 2 days. The resulting product was collected and dried at 60°C. under high vacuum. The yield was 70 percent. The product was coded CTA-MDI.

The product was deacetylated using the following procedure: sodium (1.2 gm) was added to anhydrous methanol (300 ml) contained in a 3-necked flask equipped with an agitator and nitrogen inlet and outlet tubes. After solution was complete, the CTA-MDI copolymer (10 gm) was introduced. The heterogeneous mixture was stirred continuously at room temperature for 3 hours. The resulting solid was collected, washed sequentially with methanol, methanol acetic acid (95:5) and methanol, and then dried at 60°C. under high vacuum. The intrinsic viscosity and acetyl values for the product are in Table 1.

A 0.1 percent buffered (pH 5) solution of cellulysin (from Calbiochem Co.) was prepared using 0.5M Na acetate and HOAc. The copolymer (0.1 gm) was added to the enzyme solution (10 ml) contained in a screwcap bottle and the bottle and contents was incubated at 50°C for various times. The substrate was recovered by filtration, washed several times with water, dried at 60°C. under high vacuum and its intrinsic viscosity determined. A control was run in the absence of enzyme. Cellulose (Fischer Scientific brand filter paper) was incubated in the presence of cellulysin and its intrinsic viscosity determined in Cuene solution. The results are shown in Table II and FIG. 1.

EXAMPLE 2

Example 1 was repeated in its entirety, except that m-tolylene diisocyanate (TDI) was substituted for MDI to prepare the copolymer. The yield of copolymer, coded CTA-TDI, was 90 percent. The results of the deacetylation and the enzymatic hydrolysis are in Tables I and II respectively.

EXAMPLE 3

In a 250 ml 2-necked flask fitted with an agitator and Dean-Stark trap, with condensor and drying tube attached, depolymerized cellulose triacetate (0.002 mole) was dissolved in a mixture of $CH_2Cl_2$ (50 ml) and $C_2H_4Cl_2$ (25 ml). The mixture was azeotropically distilled to collect 25 ml of distillate. Into a 250 ml 3-necked flask equipped with an agitator, thermometer, $N_2$inlet and a Dean-Stark trap with condenser and drying tube attached, were charged polypropylene glycol (PPG) (1107 av. mol wt.; 0.002 mole) and $C_2H_4CL_2$ (7 ml). The mixture was azeotropically distilled and 4 ml of distillate was collected. MDI (0.003 mole) was added to the PPG solution and the reaction mixture heated and agitated at 105°C. for 3 hours and then the dry depolymerized cellulose triacetate solution was added. After a few minutes of agitation, triethylamine (0.15 ml) was added and the reaction mixture was agitated at 70° C. for 45 hours. The resulting clear, viscous dope was diluted with $C_2H_4Cl_2$ (50 ml), filtered through a coarse sintered-glass filter and most of the solvent removed under reduced pressure. On washing the solid with ethanol a colloidal solution formed. The polymer coded CTA-MDI-PPG, was separated by centrifuging. The yield was 85 percent. The undeacetylated terpolymer had a melting point of 300° to 310°C.

The terpolymer was deacetylated using the procedure given in Example 1 except the reaction mixture was neutralized with acetic acid, the solid recovered by centrifugation and washed 3 times with methanol (each time separation was accomplished by centrifugation) and then dried at 60°C under high vacuum. The intrinsic viscosity and acetyl values are in Table I.

The terpolymer was enzymatically hydrolyzed using the procedure in Example 1. The results are in Table II.

EXAMPLE 4

Example 3 was repeated in its entirety except TDI was substituted for MDI to prepare the block terpolymer. The yield of terpolymer, coded CTA-TDI-PPG, was 89 percent. The undeacetylated terpolymer had a melting point of 310° to 315°C. The results of the deacetylation and the enzymatic hydrolysis are in Tables I and II, respectively.

TABLE 1

PROPERTIES OF THE DEACETYLATED COPOLYMERS

| Copolymer | [n] [1] | Acetyl Value (%) [2] |
|---|---|---|
| CTA-MDI | 0.35 | 9.0 |
| CTA-TDI | 0.36 | 9.8 |
| PPG-MDI-CTA | 0.43 | 10.3 |
| PPG-TDI-CTA | 0.52 | 10.7 |
| CTA (Depolymerized) | 0.16 | 10.6 |

Notes:
[1] In DMSO solution at 30°C
[2] Average of two determinations. Acetyl value of 10 percent corresponds to a D.S. = 0.42. The modified Eberstadt procedure reported in L.J. Tanghe, L.B. Genung, and J.W. Mench, "Method in Carbohydrate Chemistry, vol. 3, Academic Press, New York, 1963, p. 201, was used to determine the acetyl values. D.S. is the degree of substitution of anhydroglucose units; for example, if all three hydroxyls are substituted, D.S. = 3.

TABLE II

RESULTS OF ENZYMATIC HYDROLYSIS (i.e., Enzymatic Degradation)

| | Percent Decrease in [n] | | | | | | |
|---|---|---|---|---|---|---|---|
| Polymer | 2hr. | 5hr. | 9hr. | 10hr. | 24hr. | 48hr. | 72hr. |
| CTA-MDI | 6.1 | 31.4 | — | 54.3 | 61.4 | 71.4 | — |
| CTA-TDI | 14.7 | 20.8 | — | 36.1 | 55.6 | 69.4 | — |
| CTA-MDI-PPG | 25.6 | 33.0 | — | 40.0 | 68.6 | 74.4 | — |
| CTA-TDI-PPG | 14.9 | 21.4 | — | 26.2 | 49.9 | 62.1 | 65.0 |

TABLE II-continued

RESULTS OF ENZYMATIC HYDROLYSIS (i.e., Enzymatic Degradation)

| Polymer | 2hr. | 5hr. | 9hr. | 10hr. | 24hr. | 48hr. | 72hr. |
|---|---|---|---|---|---|---|---|
| | | | Percent Decrease in [n] | | | | |
| Cellulose | — | — | 15.4 | — | — | — | — |

Concerning Examples 1 to 4, the acid hydrolysis of the polymers was negligible. There was a substantial decrease in the intrinsic viscosity for each of the copolymers, even at a 10 hour incubation time. Cellulose showed a somewhat smaller decrease after a 9 hour incubation time — 15 percent vs. 26 to 54 percent for the block polymers after 10 hours — but this is probably due to the lower accesibility of cellulose compared to the amorphous block copolymers. The incorporation of cellulose oligomer blocks in a polymer results in biodegradability. There appears to be a polymer composition effect as the copolymers containing MDI appear to degrade more rapidly initially than those containing TDI. The block copolymers of this invention degrade more rapidly than cellulose itself.

EXAMPLE 5

To a 300 ml 2-necked flask equipped with a condensor and agitator was added dry benzene (100 ml), styrene (10.8 gm), benzoyl peroxide (0.05 gm) and thioethanol (0.3 gm). The flask and contents were heated at 65°C under a nitrogen atmosphere for approximately 10 hours or until a solids determination indicated 50% of the monomer has been converted to polymer. MDI (0.05 mole) was added and the reaction mixture heated and agitated at 80°C. for 5 hours and then a solution of dry depolymerized cellulose triacetate (0.025 mole) in a mixture of $CH_2Cl_2$ 75 ml) and $C_2H_2Cl_2$ (37.5 ml) was added. After a few minutes of agitation, triethylamine (0.15 ml) was added and the reaction mixture was added at 70°C for 45 hours. The resulting viscous solution was diluted with $C_2H_4Cl_2$ (50 ml), filtered through a coarse sintered - glass filter and most of the solvent removed under reduced pressure. The resulting polymer was dried under reduced pressure.

The polymer was deacetylated and enzymatically hydrolyzed using the procedure in Example 1.

EXAMPLE 6

Viscose rayon (0.002 mole) was swollen with distilled water and then the water displaced by ethanol in a series of treatments with ethanol-water mixtures of gradually increasing ethanol content and then the ethanol was replaced by benzene. Under an atmosphere of nitrogen dry benzene was added and the nitrogen stream continued for 1 hour. This was followed by the addition of ethylene sulfide (1 gm/gm rayon) after which the flask was heated at 75°–80°C for 6–12 hours.

Then, benzoyl peroxide (0.1 gm) and styrene freed of inhibitor, added and the mixture heated at 65°C for 10 hours.

The resulting grafted polymer was hydrolyzed enzymatically according to the procedure of Example 1.

What we claim is:

1. The biodegradable polymer having the formula:
W—M—Z wherein M is a polyanhydroglucose block which does not contain any ester substituents and wherein W and Z are organic diisocyanates having the formula:

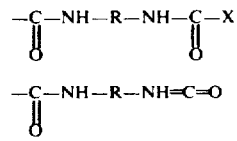

wherein R is an divalent organic radical and wherein X is a terminal group, —M—Z, —M—W or —M, said biodegradable polymer degrading faster than cellulose, said biodegradable polymer being prepared by reacting a polyanhydroglucose triester oligomer containing hydroxyl end groups with diisocyanates or with isocyanate capped non-cellulosic polymers to produce linear block copolymers containing polyanhydroglucose triester blocks, and subsequently de-esterifying said linear block copolymers to yield said biodegradable copolymer containing polyanhydroglucose blocks.

2. The biodegradable polymer of claim 1 wherein M is a cellulose oligomer block, X is —OH, and R is a polyglycol, a polyester, a polyamide or a polyether.

3. The process of preparing the biodegradable polymer of claim 1 which comprises reacting a cellulose ester oligomer having hydroxyl and groups with a diisocyanate or with a diisocyanate capped non-cellulose polymer or oligomer, the ratio of said diisocyanate to said cellulose ester oligomer being between about 2.5:1 and 1.5:1, whereby copolymers having a cellulose triester oligomer block are produced by a chain-extension type reaction, and de-esterifying the cellulose triester oligomer block to produce a polyanhydroglucose block which does not contain any ester substituents.

4. The process of claim 3 wherein said de-esterification is achieved under basic conditions and wherein all or substantially all of the hydroxyl groups of M are ester substituted.

5. The process of claim 4 wherein said de-esterification is achieved under an inert atmosphere.

6. The process of claim 5 wherein said de-esterification is achieved using a sodium alkoxide in an alkanol, said alkyl groups being the same and having 1 to 6 carbon atoms.

7. The process of claim 6 wherein a nitrogen atmosphere is used.

8. The process of claim 7 wherein M is a cellulose oligomer block, X is acetyl substituted and the ester substituents on the hydroxyl groups of M are acetyl.

9. The process of claim 8 wherein said sodium alkoxide is sodium methoxide and said alkanol is methanol.

10. The process of claim 8 wherein said sodium alkanol is sodium ethoxide and said alkanol is ethanol.

* * * * *